O. G. MILTZ.
CHURN.
APPLICATION FILED AUG. 24, 1910.
982,156.
Patented Jan. 17, 1911.
2 SHEETS—SHEET 2.
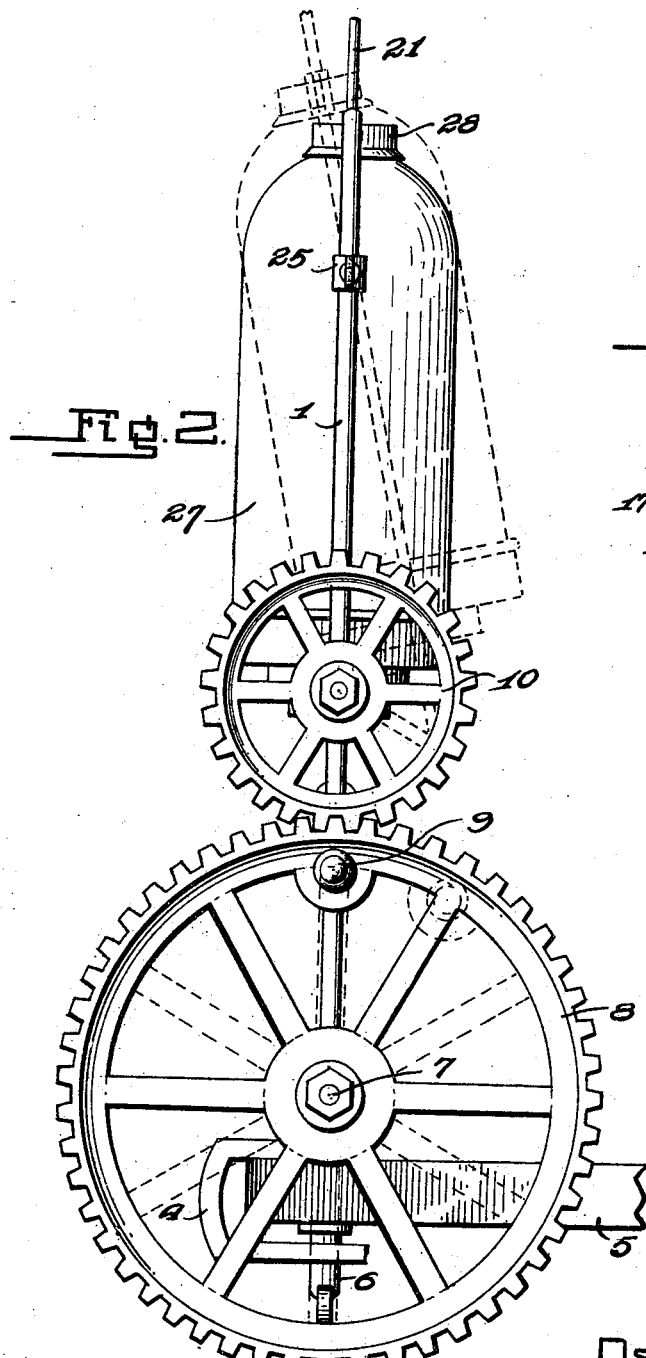
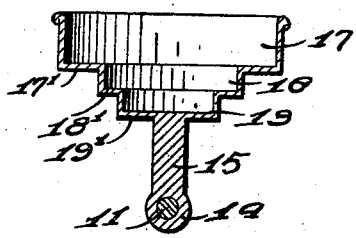
Witnesses
Inventor
Oscar G. Miltz

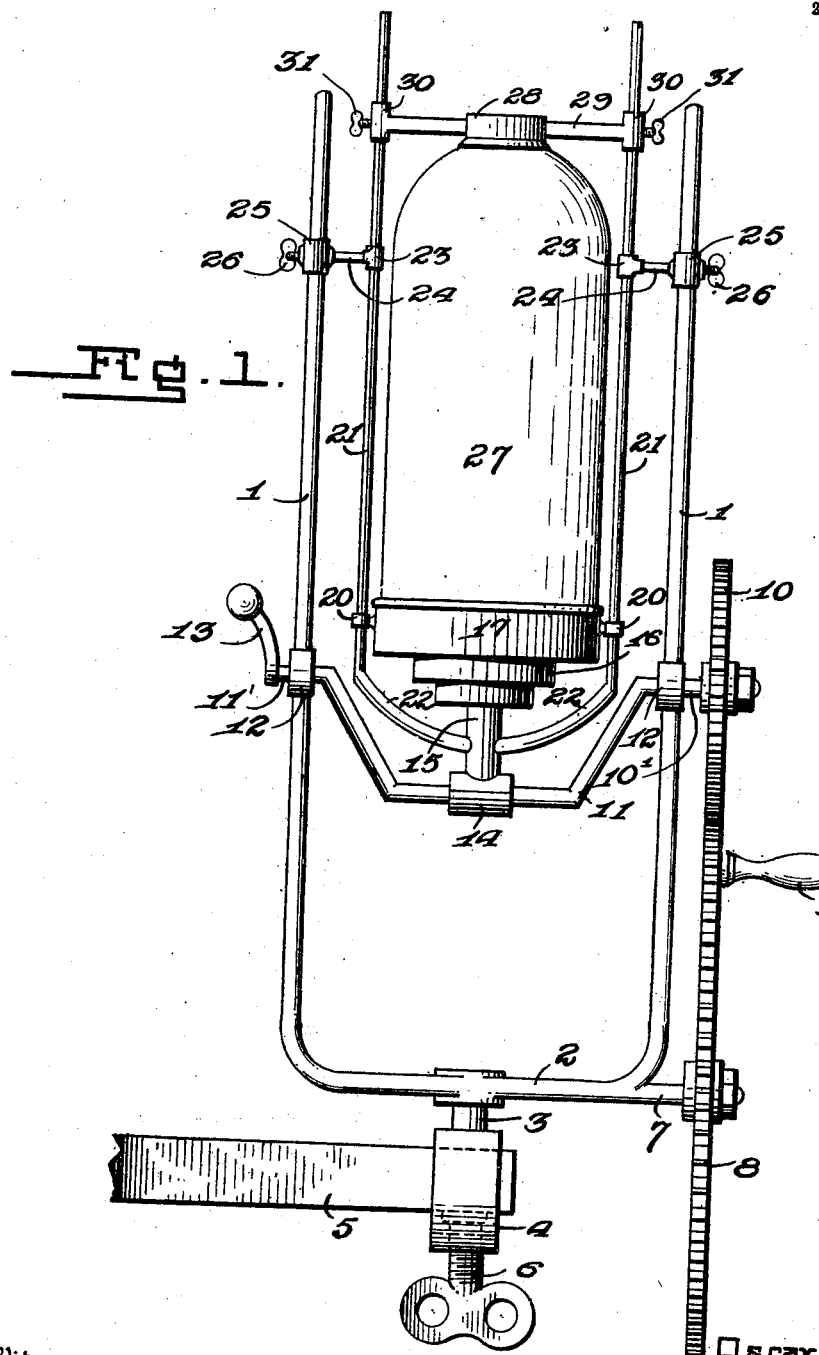

UNITED STATES PATENT OFFICE.

OSCAR G. MILTZ, OF BIG SANDY, MONTANA.

CHURN.

982,156.  Specification of Letters Patent.  Patented Jan. 17, 1911.

Application filed August 24, 1910.  Serial No. 578,626.

*To all whom it may concern:*

Be it known that I, OSCAR G. MILTZ, citizen of the United States, residing at Big Sandy, in the county of Chouteau and State of Montana, have invented certain new and useful Improvements in Churns, of which the following is a specification, reference being had therein to the accompanying drawing.

This invention relates to churns and has special reference to that class of churns in which a combined oscillating and sliding movement is imparted to the churn body.

The invention has for its object to provide an improved churn of this kind which will be simple in construction and effective in operation.

The invention further has for its object to provide an improved churn of this kind by means of which churn bodies of different lengths may be detachably mounted in the churn frame.

Referring to the accompanying drawings:—Figure 1 is a view in elevation of a churn constructed in accordance with this invention and shown as mounted upon its support. Fig. 2 is a side view in elevation of the churn. Fig. 3 is an enlarged detail view in vertical section of the bottom support for the churn body.

In the construction of this invention a vertical U-shaped frame 1 is provided, preferably formed of a metallic rod and having integral with its transverse base portion 2 a short depending rod 3 provided with a transverse U-shaped portion 4 adapted to fit over the edge of a table 5 or other support and clamped thereto by means of a set screw 6 projecting through the U-shaped portion 4 and bearing against the under side of the table 5. The U-shaped frame 1 is also formed with a short arm or projection 7 extending from one end of the base portion 2.

The mechanism for operating the churn body consists of a toothed driving wheel 8 mounted on the arm or projection 7 and having an operating handle 9, the toothed wheel 8 meshing with a smaller toothed wheel 10 which is mounted on the projecting end 10' of a crank shaft 11 having its bearings in sleeves 12 on the uprights of the U-shaped frame 1, the other end 11' of the crank shaft 11 having mounted thereon a balance arm 13. The crank shaft 11 projects through a sleeve 14 on the lower end of a short vertical arm or projection 15 on the upper end of which is mounted a support 16 for the bottom of a churn body. The support 16 is shown as preferably round formed with the upper seating chamber 17, a smaller seating chamber 18 beneath the same and a still smaller seating chamber 19 beneath the chamber 18—each of said chambers being formed smaller than the other in a downward projection by means of the step portions 17', 18' and 19'. The support 16 is formed on opposite sides with sleeves 20 through which extend and are rigidly secured to vertical rods 21 having the frame connected at their lower ends by transverse arms 22 connected to the vertical arm 15. The rods 21 project through and are slidable in sleeves 23 each of said sleeves 23 being mounted on one end of an arm 24 which is swiveled in a sleeve 25, which is clamped to the vertical rods 1 by means of a set screw 26.

While any suitable form of churn body may be used in conjunction with the churn, this invention particularly contemplates the use of what are known as "Mason jars," and a Mason jar 27 is shown as seated in the base support 16. To close the jar a cap 28 which is mounted on a transverse bar 29 having at each end a sleeve 30 and slidable upon the rod 21 and adjustably clamped thereto by means of a set screw 31.

By means of this construction, a rod 29 may be moved up and down to accommodate and permit the seating of cap 28 on jars of different lengths.

By means of the sleeves 23 connected to the sleeves 25 provided with set screw 26, the sleeve 23 may be adjusted at different heights in the rod 21 to adapt them to jars of different lengths, since in the operation of the churn the sleeves 23 and arms 24 projecting from the sleeves 25 of the trunnion the frames supporting the jar swings or rather oscillates.

It will be seen that by means of this invention upon rotating the wheel 8 motion will be imparted to the crank shaft 11 thereby causing the frame in which the jar 27 is seated to oscillate and also at the same time to have a reciprocating sliding movement by means of the rods 21 sliding forward and backward in the sleeve 23. It will further be seen that by means of this invention, Mason jars of different widths may be employed with the churn, the base portion 16 admitting of such jars being seated therein the several chambers 17', 18' and 19' being adapted to receive the bottom end of different size jars. It will be seen further that by means of this invention, Mason jars may be readily inserted and detached from the churn and at the same time the cap may be readily removed from and applied to the jar by the slidable rod 29 and firmly held in place by means of the set screws 31.

Having described the invention, I claim:—

1. In a churn of the character described, a vertical U-shaped frame formed of a metallic rod with means for detachably clamping said frame to a support, a second vertical U-shaped frame formed of a metallic rod, a churn body, base supports mounted in said second frame, trunnions connecting the first-named U-shaped frame with the churn body supporting frame, the latter being slidably connected with said trunnions, means for clamping the detachable churn body in said churn body frame, and a mechanism, connected with said churn body frame and adapted to impart a reciprocating sliding and oscillating movement thereto.

2. In a churn of the character described, a main frame, a churn body frame, means for detachably securing said main frame to a support, the churn body supporting frame having a base portion adapted to receive churn bodies of different widths, said churn body supporting frame being connected by trunnions to the main frame, means for clamping the churn body in said churn body supporting frame, and a mechanism connecting with said churn body supporting frame for imparting a combined slidable and oscillating movement thereto.

3. In a churn of the character described, a main supporting frame, means for detachably clamping it to a support, a combined slidable and oscillating churn body supporting frame connected with the main frame and having a base support for the churn body formed with a series of supporting chambers of different sizes, means for clamping the churn body in said base support, and a mechanism connected with said body supporting frame adapted to impart a slidable oscillating movement thereto.

4. In a churn of the character described, a main frame formed with vertical rods, means for detachably clamping said main frame to a support, trunnions adjustably mounted on said vertical rods, a churn body supporting frame provided with vertical rods slidably mounted in said trunnions, a socket base mounted at the lower end of said churn body supporting frame, a transverse bar adjustably mounted on the vertical rods of the churn body supporting frame and provided with a churn body cap, and a mechanism connected with the lower end of said churn body supporting frame and adapted to impart a combined slidable and oscillating movement thereto.

5. In a churn of the character described, a churn body supporting frame provided with vertical rods, a base support mounted thereon to receive the end of a jar and consisting of a tier of chambers of different sizes adapted to receive the lower end of jars of different sizes and a transverse rod having sleeves slidably mounted on the vertical rods of the supporting frame and having set screws and a cap for a jar mounted on said transverse rod.

6. In a churn of the character described, a main frame provided with vertical rods, means for detachably securing said main frame to a support, a sleeve slidably mounted on each of said vertical rods provided with a set-screw, an arm projecting from each sleeve, a sleeve on the outer end of said arm and swiveled thereon, a churn body supporting frame formed with vertical rods slidably mounted in said swiveled sleeve, a base support at the lower end of said body supporting frame and adapted to receive the lower end of a jar, a transverse rod having a sleeve at each end, adjustably mounted on each of the vertical rods of the body supporting frame, a set screw in each sleeve, a jar cap mounted on said transverse bar, a crank shaft mounted in the uprights of the main frame and connected with said body supporting frame, imparting a combined slidable oscillating movement thereto, and a mechanism mounted on the main frame for imparting movement to said crank shaft.

In testimony whereof I hereunto affix my signature in presence of two witnesses.

OSCAR G. MILTZ.

Witnesses:
 CHARLES A. TURNER,
 STEPHEN O'MALLEY.